(No Model.) 2 Sheets—Sheet 1.
J. H. THOMAS.
TEDDER.
No. 315,856. Patented Apr. 14, 1885.
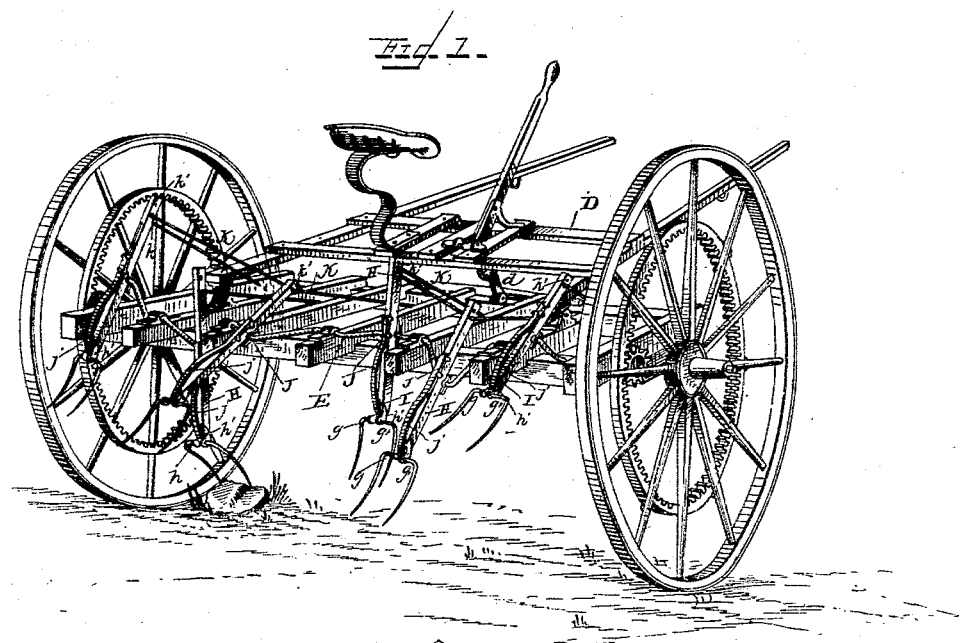
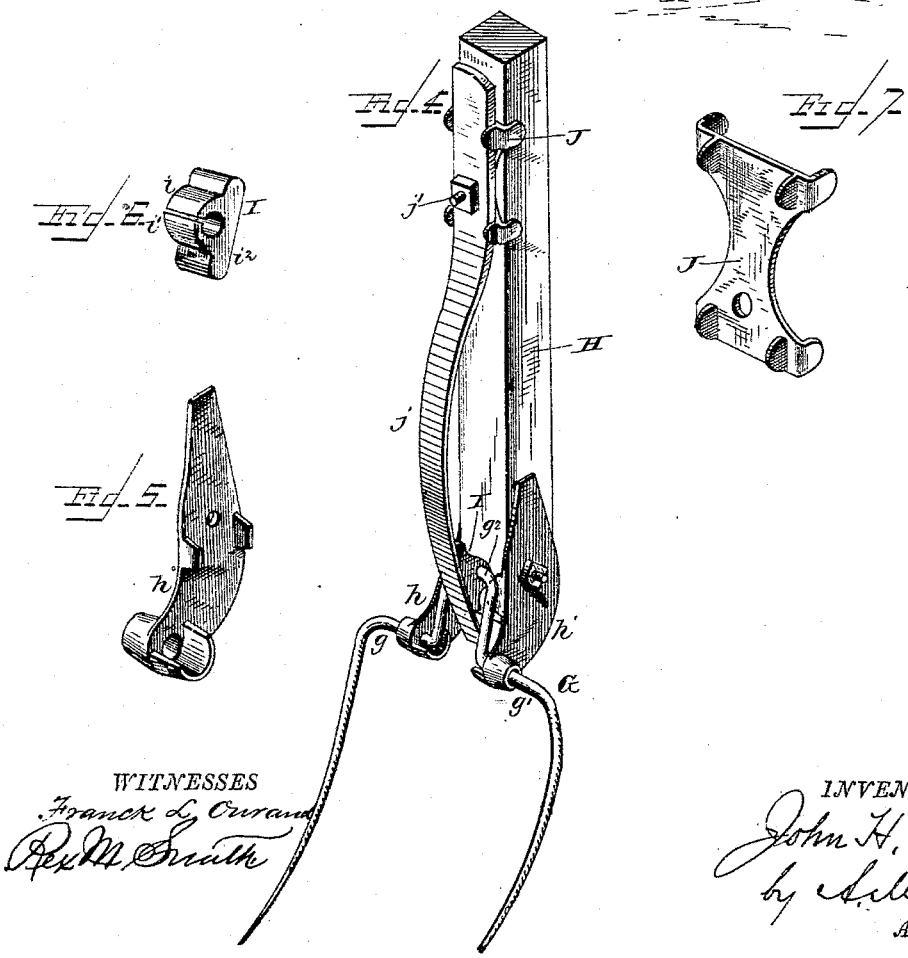
WITNESSES
Franck L. Curran
Rex M. Smith
INVENTOR
John H. Thomas
by A. M. Smith
Attorney (No Model.) 2 Sheets—Sheet 2.
J. H. THOMAS.
TEDDER.
No. 315,856. Patented Apr. 14, 1885.
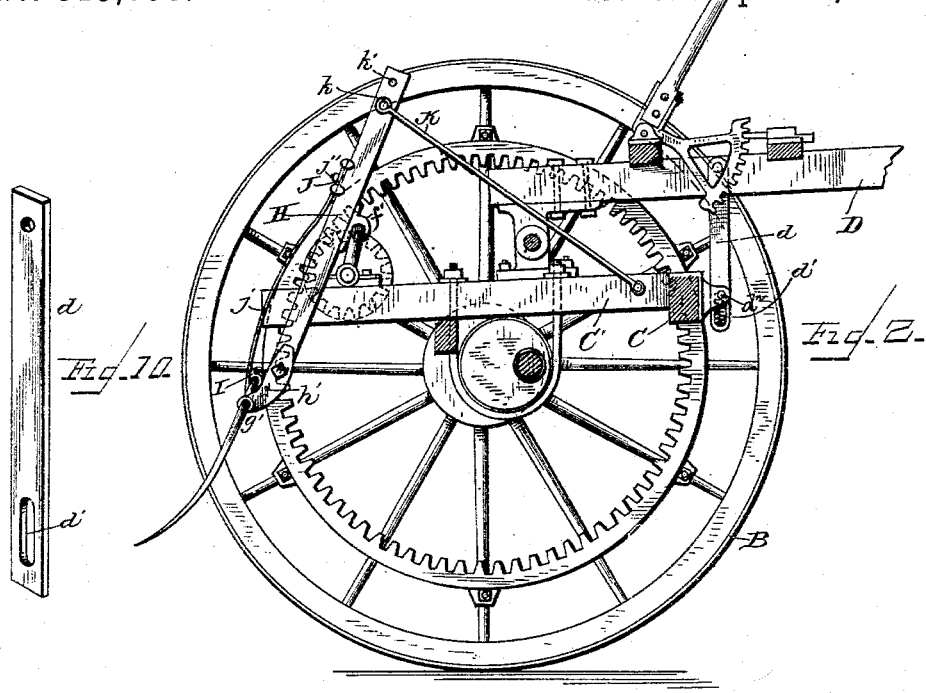
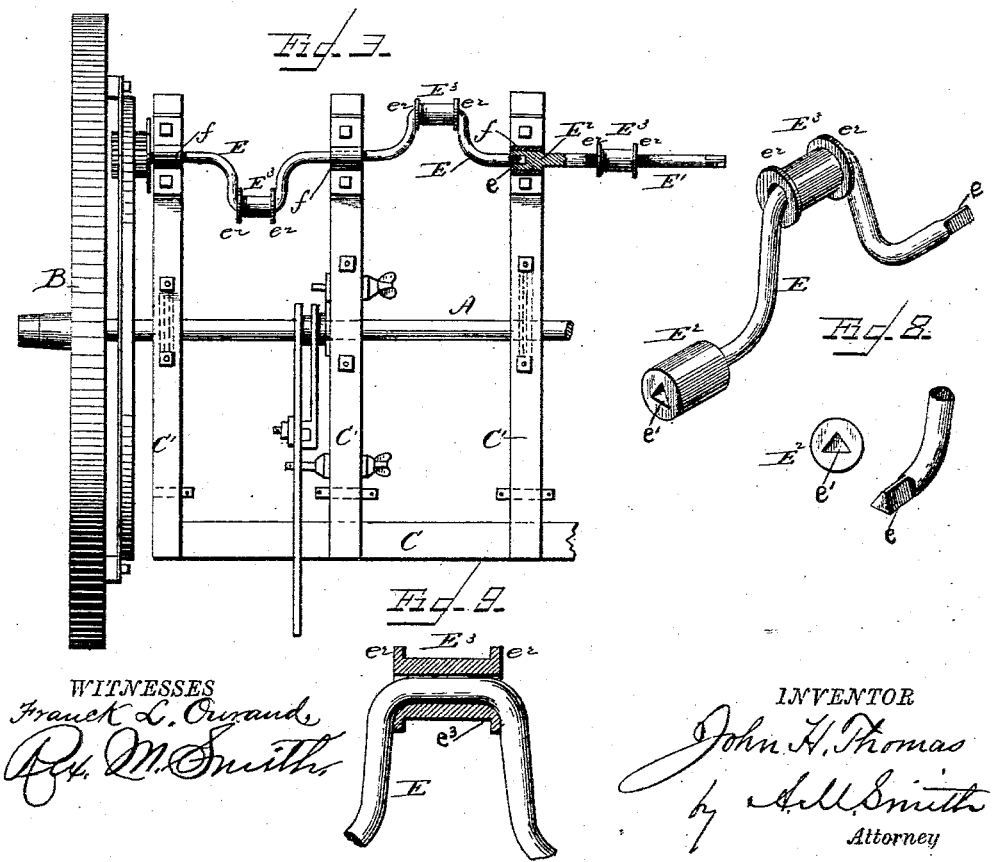
WITNESSES
Franck L. Durand
R. M. Smith
INVENTOR
John H. Thomas
by A. M. Smith
Attorney

UNITED STATES PATENT OFFICE.

JOHN H. THOMAS, OF SPRINGFIELD, OHIO.

TEDDER.

SPECIFICATION forming part of Letters Patent No. 315,856, dated April 14, 1885.

Application filed July 31, 1884. (No model.)

*To all whom it may concern:*

Be it known that I, JOHN H. THOMAS, of Springfield, county of Clark, and State of Ohio, have invented a new and useful Improvement in Hay-Tedders, of which the following is a full, clear, and exact description, reference being had to the accompanying drawings, making part of this specification.

This invention relates to a novel construction of the sectional or divided crank-shaft actuating the tedder-forks, and to the manner of uniting the sections thereof and of supporting them in bearings on the main frame; also to the manner of providing the cranks with enlarged crank-wrists, journals, or boxes for giving increased wearing-surface, and thereby increased durability, to the shaft and cranks; also to the means for adjusting the leverage and throw of the forks, as will be explained.

In the accompanying drawings, Figure 1 is a perspective view of a hay-tedder with my improvements applied. Fig. 2 represents a vertical longitudinal section through the same. Fig. 3 is a plan view of a portion of the same, partly in section; and Figs. 4 to 10, inclusive, represent details of construction and arrangement of parts hereinafter described.

The machine in its organization or general arrangement of parts is similar to that described in an application filed for Letters Patent No. 304,374, granted me September 2, 1884, and will not, therefore, be herein described in detail further than is necessary to an understanding of the improvements herein claimed.

A represents the axle; B and B', the driving-wheels mounted and turning freely thereon, and C C' the main frame, composed, by preference, of the transverse bar C and a series of longitudinal bars, C', extending rearwardly from bar C, to which they are rigidly connected in any suitable manner, sufficient in number to provide for bearings for the shaft actuating the tedder-forks on each side of each crank, the frame being also provided with suitable bearings for eccentric journals on the axle, by the rocking of which the crank-shaft can be thrown into or out of gear, in a manner explained in my former application above referred to.

D indicates the shafts or draft attachment, suitably hinged at its rear end to the main frame at or near the vertical plane of the axle, and connected with the forward end of said frame by one or more links, $d$, which serve to hold the frame C C' at the desired angle of relation to the ground. The link $d$ may be connected at its upper end with an arm or notched sector or a bell-crank lever, by means of which the angle of the frame may be adjusted as desired for giving the tedder-forks a proper working relation to the ground, a latch engaging the notches or teeth of the sector to hold it and the frame at the desired adjustment.

It will be understood that when the forks and their actuating crank-shaft are applied to the rear ends of the frame-bars C', as shown, the preponderance of weight will be upon such rear end of the frame, and will tend to depress said rear end and to rock the forward end of the frame upward. This is prevented by the link $d$, which is connected with the joint connecting the rear end of the shafts or draft attachment, and serves to make the connection of the frame with the latter rigid, but adjustable, as explained.

To provide for a limited upward movement of the rear end of the frame, adapting it to yield to an obstruction to the downward thrust of the forks, I provide the link $d$ with a slot, $d'$, allowing relative movement of the link $d$ and the pin $d^2$, connecting said link with the forward end of the frame. The weight upon the rear end of the frame will hold ordinarily the forward end raised with the pin $d^2$ at the upper end of the slot $d'$; but if the forks strike an obstruction sufficient to cause them to lift the rear end of the frame the pin $d^2$ will descend in the slot $d'$ and permit such movement. If, with this arrangement, the frame should be found to rise too easily or to be too sensitive to the action of obstructions for the proper performance of its work, a spring or springs may be interposed between the pin and the bottom of the slot, or at other suitable point, to prevent the too free movement of the pin in the slot. The slot may be of any length necessary to give the desired freedom of movement to the frame, and may be formed in either end of the link, as preferred.

The crank-shaft is composed of sections E E', by preference, each crank in a section separate from the other cranks, and adapted to be united in the bearing-boxes $f$ on the frame by couplings $E^2$, which form also enlarged journals for the shaft. These couplings, instead of being made separate from the crank-sections, as described in my application No. 106,250, filed September 12, 1883, are rigidly connected with the sections, either by being cast or shrunk upon one end thereof or otherwise suitably united thereto. The outer end of this coupling-journal is provided with a socket, $e'$, to receive the adjoining end $e$ of the adjacent crank-section. The form of the end $e$ and of the socket $e'$ in the coupling $E^2$ for the reception of said end should be such as to adapt the cranks to be set at the desired angle of relation one to the other, and when the sections are coupled together the connection should be such as to adapt one section of the shaft to actuate or be actuated by the adjoining section, and there should be sufficient freedom of movement of the end $e$ in the socket $e'$ to prevent binding or cramping of the shaft in its bearings on the frame in case any of the latter should become slightly deflected from a right line.

With the shaft made in sections, as described, it is important that bearings therefor be provided on each side of each crank, and this is provided for in the construction of the frame as described.

It is desirable to make the crank-shaft as light as is consistent with the work it is required to do, and to do this, and at the same time to give it wearing-surfaces of sufficient size to prevent the speedy destruction of the shaft and its bearings and fork-boxes, it is provided with the coupling-bearings, as described, and also upon its crank portions which rotate in the fork-boxes with enlarged wrists or journals $E^3$. These are cast or otherwise formed of the desired size, and are provided with a central perforation of suitable diameter to fit the crank-rod, and are slipped upon the latter prior to bending the crank therein, after which, when the crank is formed, they are firmly held in place thereon. They are, by preference, provided with peripheral flanges $e^2$ at the ends, which serve to hold the fork-boxes $f'$ against lateral displacement.

Similar flanges may be formed on the ends of the coupling-journals $E^2$, for preventing lateral displacement of the crank-shaft sections.

By the construction described the wearing-surfaces of the crank-shaft are materially enlarged and the durability of the shaft greatly increased.

The form of the fork proper, G, is shown in Fig. 4, where it is shown with two tines with intermediate transverse portions, $g$ and $g'$, journaled in bearing straps or plates $h\ h'$ on the lower end of the bar or handle H, said portions $g$ and $g'$ being connected by a crank-shaped portion, $g^2$.

Upon the crank portion $g^2$ of the fork is secured a swiveling block, I, which may be cast or otherwise formed with a perforation adapting it to fit or turn or rock on the crank $g^2$, in which case it may be slipped over the wire or rod of which the fork is to be formed before the latter is bent into the shape required; or it may be formed of malleable material, having a socket partially formed by ears $i'$ to receive the crank $g^2$, and afterward bent over the latter into the form shown in Fig. 6, to prevent displacement of the block. One side of this block is flattened and elongated, as shown at $i^2$, to form a bearing-surface for the spring $j$, the function of which is to hold the fork in proper working position, while adapting it to yield to an obstruction which otherwise would be liable to break or injure it. The spring $j$ is secured to the bar H by means of a flanged plate, J, and single through-bolt $j'$, as shown.

By the use of the block I a greatly-increased wearing-surface is obtained as compared with a machine in which the spring acts directly on the crank portion of the fork, as in my application No. 106,251, referred to, and the rapid destruction of the fork is thereby prevented.

The fork stale or handle H is provided near its upper end, to which the swinging links or radius-bars K are attached, with two or more eyes or perforations, $k\ k'$, through either of which said links may be connected with the fork.

For ordinary work the link will be connected to the fork through the eye or perforation nearest the crank-shaft; but where the grass is so heavy as to cause the wheels to slip, by connecting the links with the fork-handles through the outer holes, the throw of the fork will be diminished, the length of the fork-lever increased, and the power required for actuating them correspondingly reduced.

Aside from the features specifically described the tedder may be constructed in any usual or preferred manner, and changes may be made in the form or construction of those described without departing from the invention. The crank-wrists $E^3$, for instance, are provided at the ends of the perforations with recesses or depressions $e^3$, into which the metal of the crank-rod sinks in bending the cranks, in such manner as to prevent the wrists from turning on and wearing the cranks. Any other suitable means may be employed for that purpose.

Having now described my invention, I claim as new—

1. In a hay-tedder, a crank-shaft formed in sections having journal portions fast each on one end of each crank-shaft section, and suitable means for coupling said journal portion loosely to and adapting it to actuate or be actuated by the adjoining crank-shaft section, substantially as described.

2. In a hay-tedder, the crank-shaft made in sections, each complete in itself—that is to say, having each a journal portion and a crank rigidly united to said journal portion, and provided with means for coupling the journal portion loosely to and adapting it to actuate or be actuated by the adjoining section—substantially as described.

3. In a hay-tedder, a crank-shaft having a series of two or more cranks and made in sections having each a crank and a coupling journal portion rigidly secured to said crank, and provided with suitable means for coupling it loosely to and adapting it to actuate or be actuated by the adjoining section, substantially as described.

4. In a hay-tedder, the combination, with the crank portions of the crank-shaft, of the spools or enlarged wrists or wearing-surfaces applied thereto, substantially as described.

5. The hay-tedder teeth or fingers provided with the crank portion, in combination with the swiveling wearing-block on said crank portion, substantially as and for the purpose described.

6. The combination of the tedder teeth or fingers pivoted in bearings in the fork-handle, the interposed connecting-crank, the wear-block on said crank, and the spring fast on the fork-handle, all substantially as described.

7. In a hay-tedder, the forks connected with and operated by means of the continuously-rotating cranks, in combination with the vibrating radius rods or links forming fulcrums for and connecting the fork-arms with the tedder-frame, and means for adjusting said links on the fork-arms relatively to the actuating-cranks, substantially as and for the purpose described.

In testimony whereof I have hereunto set my hand this 29th day of July, A. D. 1884.

JOHN H. THOMAS.

Witnesses:
  H. H. BEAN,
  A. D. CRANE.